United States Patent
Bernardi

(10) Patent No.: US 8,414,232 B2
(45) Date of Patent: Apr. 9, 2013

(54) OPERATING HEAD

(75) Inventor: Paolo Bernardi, Cattolica (IT)

(73) Assignee: HSD S.p.A., Pesaro (IT)

( * ) Notice: Subject to any disclaimer, the term of this patent is extended or adjusted under 35 U.S.C. 154(b) by 965 days.

(21) Appl. No.: 12/487,462

(22) Filed: Jun. 18, 2009

(65) Prior Publication Data

US 2009/0324355 A1    Dec. 31, 2009

(30) Foreign Application Priority Data

Jun. 19, 2008  (IT) ............................. BO2008A0389

(51) Int. Cl.
*B23C 1/12*  (2006.01)
(52) U.S. Cl. ........ 409/144; 409/230; 409/201; 409/211; 409/215
(58) Field of Classification Search ................. 409/144, 409/201, 211, 215, 216, 230, 231, 232, 233; *B23C 1/12; B23Q 5/04, 5/10, 16/02, 3/12, B23Q 1/54*
See application file for complete search history.

(56) References Cited

U.S. PATENT DOCUMENTS

| | | | | |
|---|---|---|---|---|
| 3,597,389 A | * | 8/1971 | Kreimer | 523/116 |
| 3,757,637 A | * | 9/1973 | Eich et al. | 409/230 |
| 4,557,645 A | * | 12/1985 | Marsland | 409/144 |
| 4,614,468 A | * | 9/1986 | Waldrich et al. | 409/211 |
| 5,718,545 A | * | 2/1998 | Husted | 409/201 |
| 5,823,722 A | * | 10/1998 | Takenaka | 409/230 |
| 6,450,074 B1 | * | 9/2002 | Yong-Chang | 82/154 |

FOREIGN PATENT DOCUMENTS

| | | | |
|---|---|---|---|
| EP | 231085 A | * | 8/1987 |
| EP | 0743139 A | | 11/1996 |
| EP | 1316385 A2 | | 6/2003 |
| JP | 55090215 A | * | 7/1980 |
| JP | 62015006 A | * | 1/1987 |
| JP | 03086416 A | * | 4/1991 |
| JP | 2007090451 A | * | 4/2007 |
| WO | WO 2006069637 A1 | * | 7/2006 |

OTHER PUBLICATIONS

European Search Report dated Sep. 21, 2009 as issued in European Application No. 09163169.7.

* cited by examiner

*Primary Examiner* — Daniel Howell
(74) *Attorney, Agent, or Firm* — Workman Nydegger

(57) ABSTRACT

In an operating head, a tool assembly is provided with an inlet shaft engaged on an electrospindle and pivotally engaged through a corresponding containing casing, which is oriented about a longitudinal axis of the electrospindle by means of an electric motor coaxially mounted to the axis and provided with a rotor coupled in an angularly fixed manner to the casing itself.

6 Claims, 2 Drawing Sheets

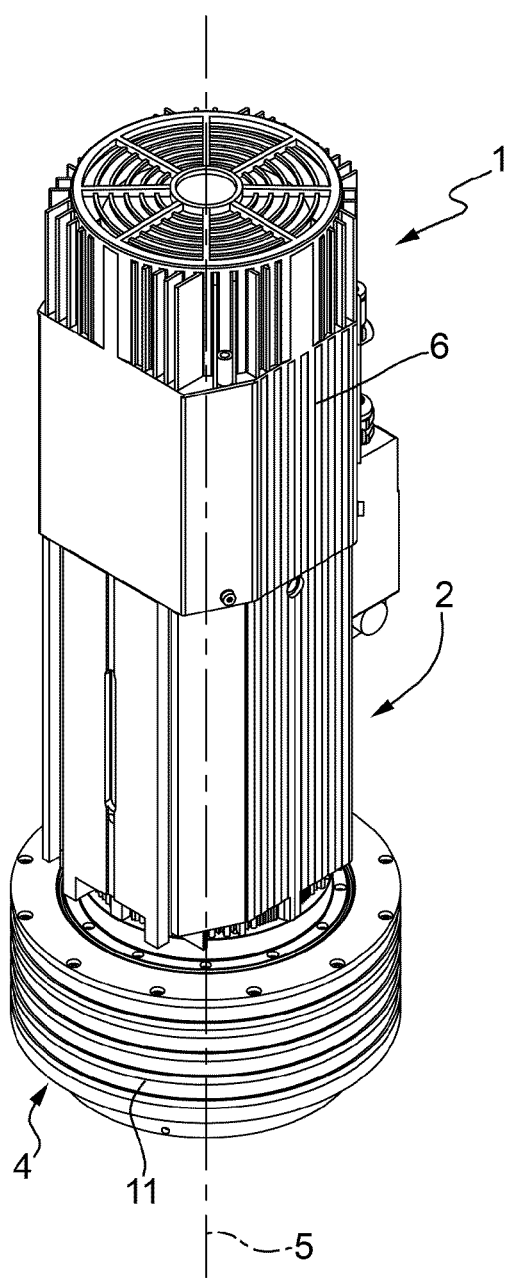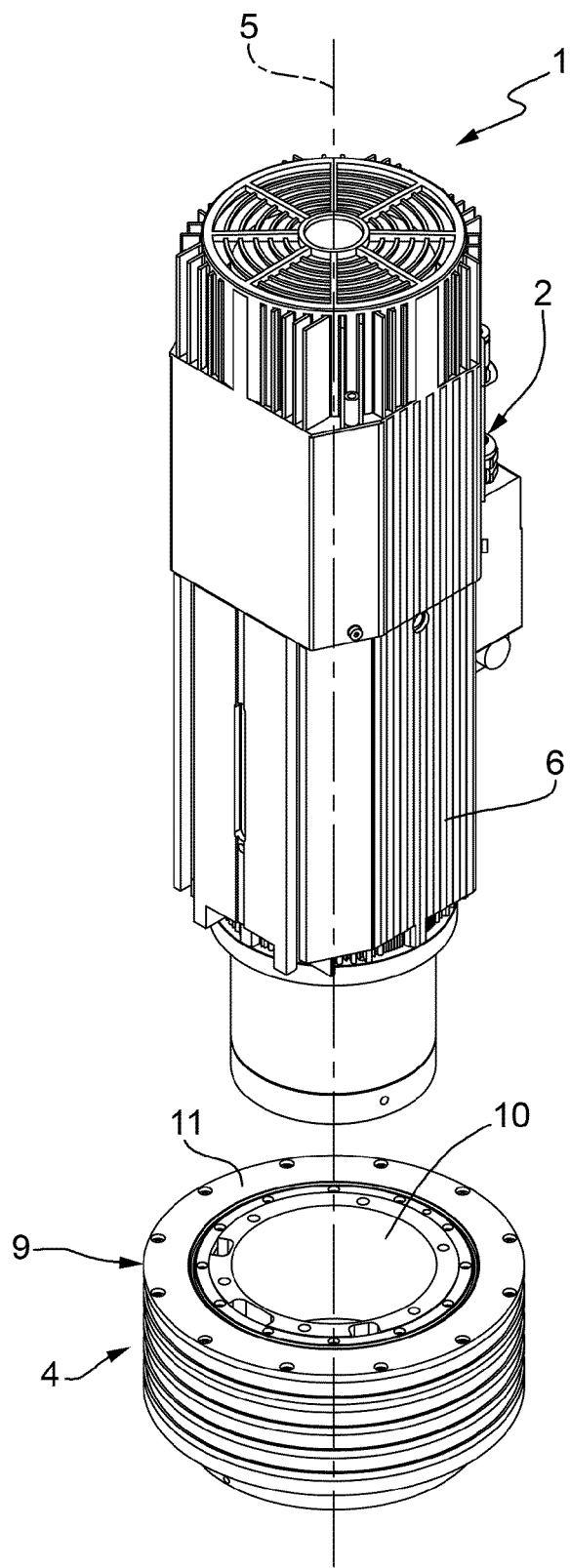

OPERATING HEAD

The present invention relates to an operating head.

The present invention finds particularly advantageous use in operating heads for machining wood components or the like, to which explicit reference will be made in the following description without therefore loosing in generality.

BACKGROUND OF THE INVENTION

In the field of machining wood components or the like, it is known the use of an operating head of the type described in European application patent EP-743139-A1 and comprising an electrospindle, and a tool assembly mounted to the electrospindle, adapted to be oriented about a longitudinal axis of the electrospindle itself.

The electrospindle comprises a containing casing, and a first electric motor accommodated inside the containing casing and provided with a tubular outlet shaft defining a tool-holder electrospindle onto which an inlet shaft of the tool assembly is engaged.

The inlet shaft is pivotally engaged through a containing casing of the tool assembly coupled in an angularly fixed manner to a sleeve, which is pivotally fitted onto the containing casing of the electrospindle, and is coupled to an outlet shaft of a second electric motor laterally fixed to the containing casing of the electrospindle by means of a pair of gears.

The known operating heads of the above-described type have some drawbacks mainly deriving from that these operating heads have relatively large dimensions due to the side position of the second electric motor and that the inevitable clearances present when coupling the teeth of the mentioned gears may compromise the correct positioning of the tool assembly about the longitudinal axis of the electrospindle.

SUMMARY OF THE INVENTION

It is an object of the present invention to provide an operating head which is free from the above-described drawbacks and which is simple and cost-effective to be implemented.

According to the present invention, there is provided an operating head as claimed in the attached claims.

BRIEF DESCRIPTION OF THE DRAWINGS

The present invention will now be described with reference to the accompanying drawings, which illustrate a non-limitative embodiment thereof, in which:

FIG. 1 is a perspective view, with parts removed for clarity, of a preferred embodiment of the operating head of the present invention;

FIG. 2 is an exploded perspective view, with parts removed for clarity, of the operating head in FIG. 1.

DETAILED DESCRIPTION OF THE INVENTION

Figure 3:
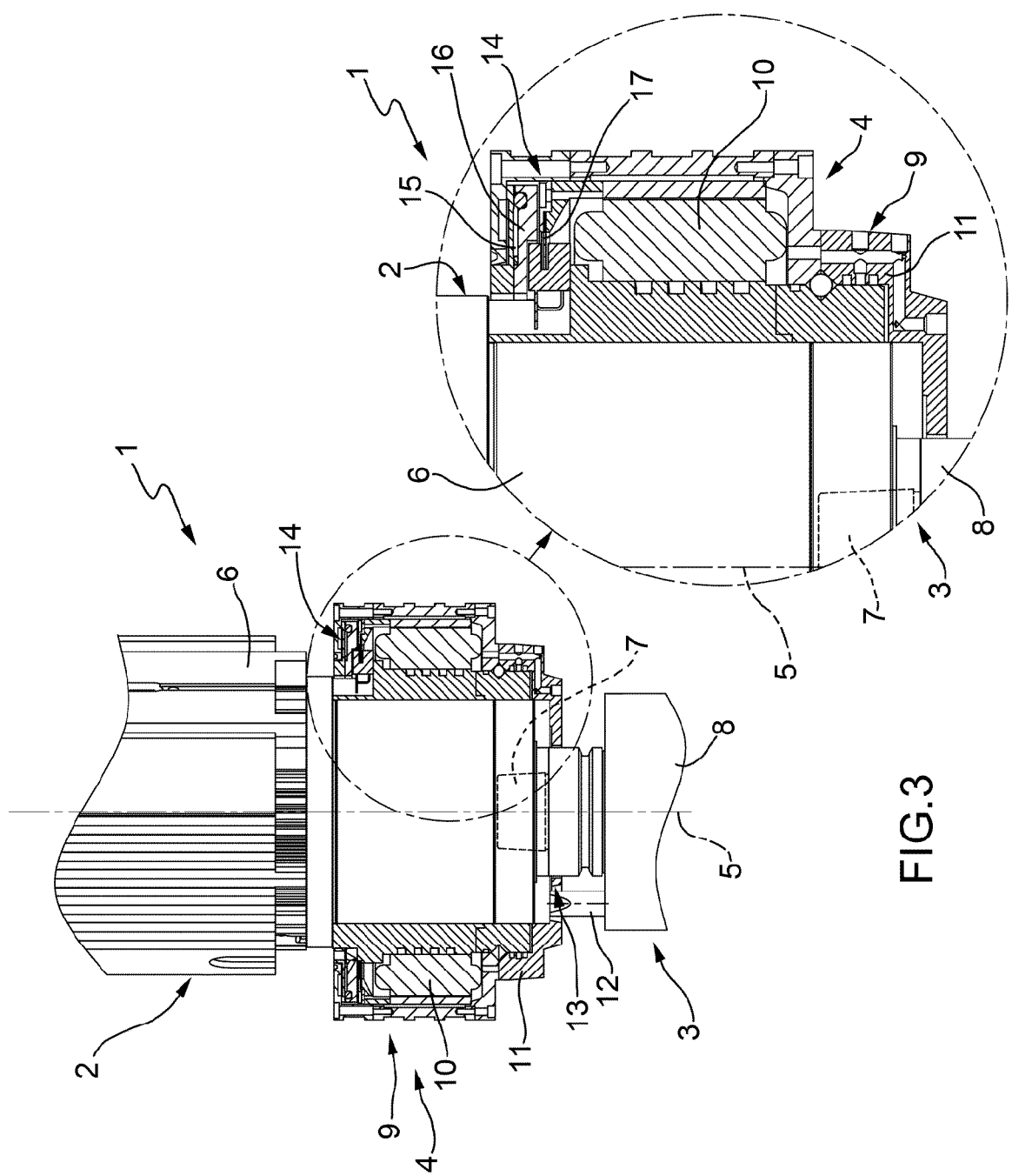
FIG. 3 is a side view, with parts in section, parts removed and parts enlarged for clarity, of a detail of the operating head in FIGS. 1 and 2.

With reference to FIGS. 1, 2, and 3, numeral 1 indicates, as a whole, an operating head comprising an electrospindle 2, a tool assembly 3 mounted to the electrospindle 2, and an orienting device 4 for orienting the tool assembly 3 about a longitudinal axis 5 of the electrospindle 2 itself.

The electrospindle 2 comprises an external tubular casing 6, extending about axis 5, and accommodates an electric motor of known type (not shown) therein, which is provided with a tubular outlet shaft (not shown) which is mounted so as to rotate about axis 5, with respect to casing 6, and has a free end length defining a tool-holder electrospindle (not shown) on which an inlet shaft 7 of the tool assembly 3 is engaged.

A tool assembly 3 is normally defined by a machining assembly comprising an external tubular casing 8 pivotally engaged by the shaft 7, and a tool-holder electrospindle (not shown), which is coupled to the shaft 7 in order to rotate, with respect to casing 8, about a longitudinal axis thereof (not shown) normally arranged at an angle other than 0° with respect to axis 5, and is adapted to receive and hold a tool of known type (not shown).

The orienting device 4 comprises an electric motor 9 coaxially mounted to axis 5 and comprising, in turn, an internal tubular stator 10, which is fitted onto a free end of the casing 6, and is coupled to the casing 6 itself in an angularly fixed manner, and an external rotor 11, which is substantially cup-shaped with a concavity facing upwards, extends about the stator 10 in order to rotate, with respect to stator 10, about axis 5, and is coupled in an angularly fixed manner to the casing 8 of the tool assembly 3 by means of a fastening pin 12, which protrudes upwards from the casing 8 parallelly to axis 5, and engages a hole 13 obtained through the rotor 11 itself.

The rotor 11 and thus the casing 8 are locked in a certain angular position about axis 5 by means of a locking device 14 comprising a pneumatic actuating cylinder 15, which is obtained inside the stator 10, coaxially to axis 5, is connected to a pneumatic feeding device (not shown) and is slidingly engaged by an annular piston 16 which is movable within the cylinder 15 and parallelly to axis 5 between a locking position, in which the piston 16 is fastened against an elastically deformable annular element 17 fixed to the rotor 11, coaxially to axis 5, and a releasing position.

The shape of the orienting device 4 confers relatively small dimensions and a relatively high compactness to the operating head 1. Furthermore, directly coupling the rotor 11 of the electric motor 9 to the casing 8 of the tool assembly 3 ensures a correct positioning of the tool assembly 3 about axis 5.

The invention claimed is:

1. An operating head comprising an electrospindle comprising, in turn, a first containing casing and a first electric motor accommodated inside the first casing and provided with a tubular outlet shaft, which is mounted so as to rotate about a longitudinal axis thereof, and defines a tool-holder electrospindle; a tool assembly comprising, in turn, a second containing casing and an inlet shaft pivotally engaged through the second casing and engaged on said tool-holder electrospindle; and an orienting device for orienting the second casing about said axis; and characterized in that the orienting device comprises a second electric motor coaxially mounted to said axis and comprising, in turn, a stator fitted onto the first casing and a rotor coupled an in angularly fixed manner to the second casing and pivotally about the stator so as to rotate about the axis itself.

2. An operating head according to claim 1, wherein the stator extends about one end of the first casing and is coupled to the first casing itself in an angularly fixed manner.

3. An operating head according to claim 1, wherein the rotor extends about the stator.

4. An operating head according to claim 1 and further comprising a locking device for locking the rotor and thus the second casing in a certain angular position about said axis.

5. An operating head according to claim 4, wherein the locking device comprises an actuating cylinder obtained in the stator and provided with a piston which is movable between a locking position, in which the piston is fastened against the rotor, and a releasing position.

6. An operating head according to claim 5, wherein the locking device further comprises an elastically deformable member carried by the rotor and arranged in contact with the piston for moving the piston itself from the locking position to the releasing position.

\* \* \* \* \*